March 4, 1941.　　　　J. M. MILAN　　　　2,233,427
BRAKE
Filed Dec. 7, 1936　　　2 Sheets-Sheet 2
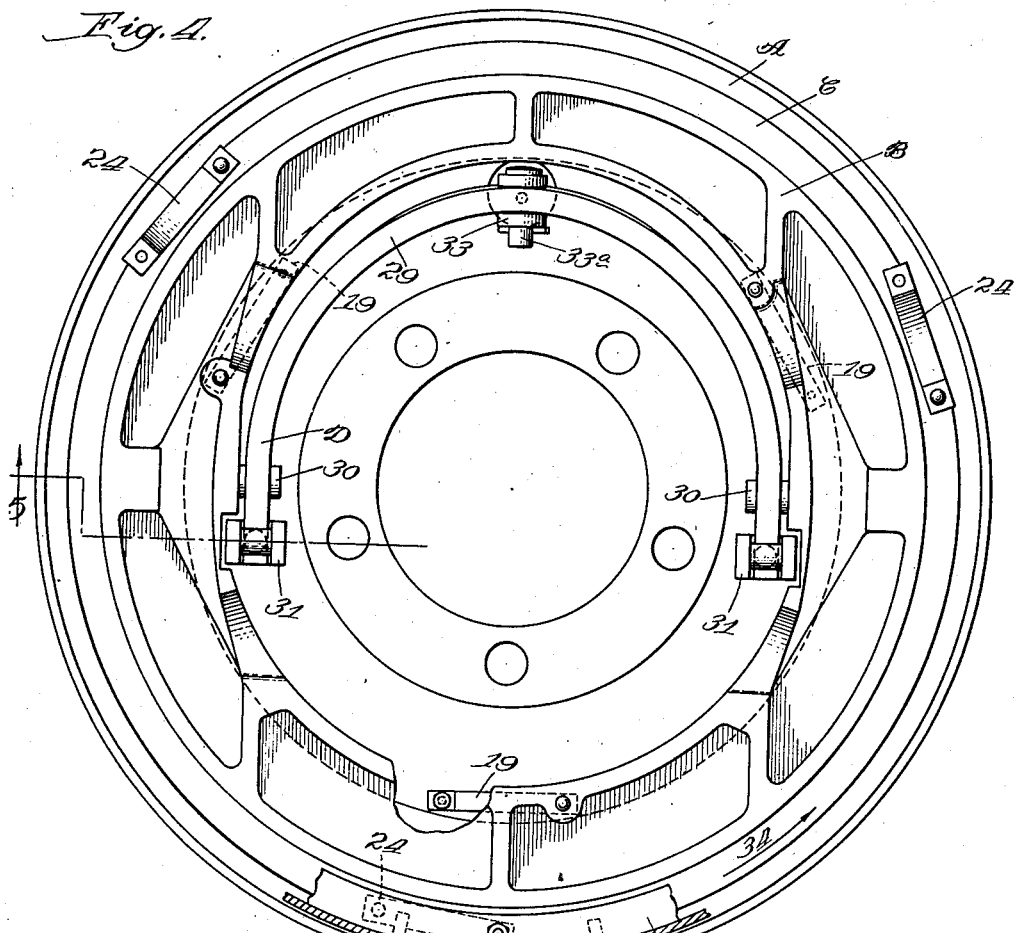
Fig. 4.
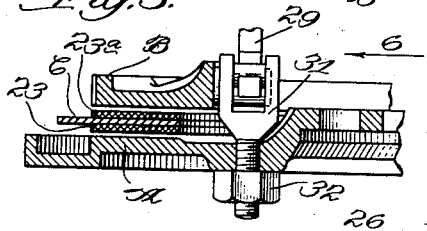
Fig. 5.
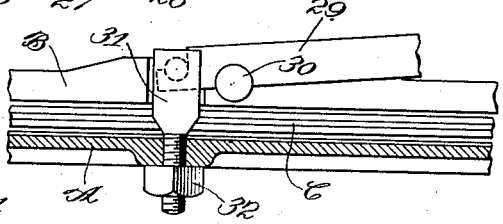
Fig. 6.
Fig. 7.
Inventor:
Joseph M. Milan
By Dyrenforth, Lee, Chritton & Wiles
Attys.

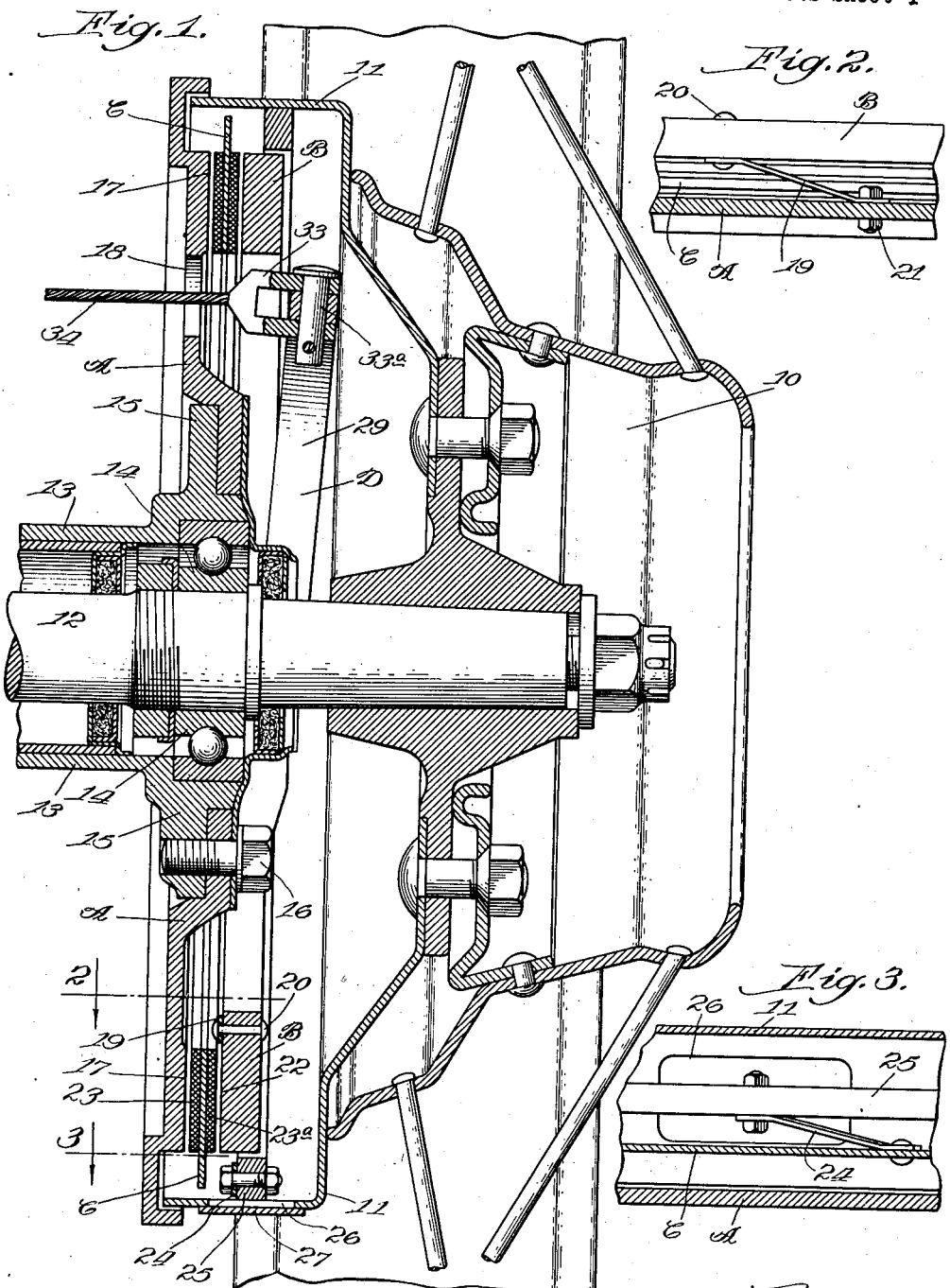

Patented Mar. 4, 1941

2,233,427

UNITED STATES PATENT OFFICE 2,233,427

BRAKE

Joseph M. Milan, Indianapolis, Ind., assignor of four and three-tenths per cent to Andrew Nordin, Los Angeles, Calif.

Application December 7, 1936, Serial No. 114,683

11 Claims. (Cl. 188—72)

This invention relates to a brake and more particularly to a disk type brake for use on automobiles and other motor vehicles.

An object of the invention is to provide a brake of high efficiency and long life, and in which the frictional wear between the various parts is reduced to a minimum.

A specific object is to provide a disk type brake in which springs are employed to hold the disk in its proper position relative to the other parts.

A further object is to provide a disk type brake in which both the disk and the pressure plate are held in proper rotational relation by spring members secured to parts of the brake. Other specific objects appear as the specification proceeds.

In well-known constructions of the disk type of brake, a disk is supported between a backing plate and a pressure plate; and when the backing plate and pressure plate are brought together, they frictionaly engage the disk to exert the braking torque. In some constructions the backing plate and pressure plate are secured by pins extending through slots in the disk. This manner of securing the backing plate and pressure plate, while leaving the disk free to rotate, is subject to several disadvantages. The friction caused by the sliding of the pins in the slots, which may be present whenever the vehicle is in motion, soon causes excessive wear which greatly decreases the life of the brake. Also, this construction requires the use of coil springs about the pins, or other similar expedient for positioning the disk relative to the backing plate and pressure plate.

In my improved construction, I provide spring means for securing the backing plate and pressure plate, and also for securing the disk and the wheel of the vehicle, the same means being also adapted to maintain the parts in proper relative positions.

A preferred embodiment of my invention is illustrated in the accompanying drawings in which—

Figure 1 is a broken vertical sectional view of my improved structure as applied on the left rear wheel of an automobile of well known make; Fig. 2, a detailed sectional view and showing a pressure plate, the section being taken as indicated at line 2 of Fig. 1; Fig. 3, a detailed sectional view showing a disk spring, the section being taken at line 3 of Fig. 1; Fig. 4, a side elevational view with the wheel and axle removed; Fig. 5, a detailed sectional view taken as indicated at line 5 of Fig. 4, and showing the attachment at the ends of the yoke; Fig. 6, a detailed sectional view similar to Fig. 5, except that the section here shown is perpendicular with the plane of the section shown in Fig. 5; and Fig. 7, a detailed sectional view taken as in Fig. 3, showing a modified type of spring.

As illustrated, A designates a backing plate; B, a pressure plate; C, a friction disk; and D, mechanism for moving the pressure plate toward the backing plate.

My improved brake may be used in connection with any common form of wheel and axle assembly such as that shown in Fig. 1 in which a wire wheel 10, equipped with a drum 11, is firmly secured to an axle 12 mounted in casing 13 by the use of bearing 14.

The backing plate A is here attached to flange 15 of casing 13 by bolts 16, which is the common construction. On the inside of plate A is an annular surface 17 which is uniform and provides one of the friction surfaces. An opening 18 in the top portion allows the entrance of a cable or other means for controlling the action of the brake.

The pressure plate B comprises an annular piece which is spaced from the backing plate A, and which is secured to plate A by springs 19, one of which is clearly shown in Fig. 2. The springs 19 have a diagonal central portion and parallel end portions. At their one ends, springs 19 are secured to the member B by rivets 20, and are secured at their other ends to plate A inside annular surface 17 by the use of bolts 21. In this embodiment, three such springs are attached to the pressure plate and backing plate at equal angular spacings, but any number of such springs may be used, and the spacing may be varied as desired. The outer side of member B may be of any form, but the inner side, adjacent disk C, has the annular friction surface 22 which is regular and uniform.

The disk C, annular in form, extends between plate A and member B and has attached on its sides lining rings 23 and 23ᵃ co-extensive with friction surfaces 17 and 22. The outer periphery of the disk extends beyond the edges of the lining rings and member B, and at spaced intervals about its periphery the disk has attached the springs 24, more clearly shown in Fig. 3.

A drum ring 25 is secured to the interior of drum 11 by any suitable means, such as by welding or riveting. When more convenient, this ring may be in sections, or discontinuous, it being necessary only for securing the one ends of springs 24 to drum 11. The inside diameter of the ring should be larger than the outside diameter of member B, so that the member B and ring never come into contact.

Springs 24 are of the same type as springs 19, but are preferably more sturdy as they are required to withstand greater strain. At their one ends they are riveted to disk C and at their other ends are bolted to ring 25. Other means of attachment may, of course, be used. As it is necessary to attach springs 24 after the drum 11 is in place, openings 26 are made in the walls of the drum to allow access for attaching the ends of springs 24. Cover plates 27 are attached over openings 26 by screws 28 extending also into ring 25. In Fig. 4, a broken section of the drum is shown to illustrate more clearly the position of the opening 26 and cover 27.

Mechanism D, for bringing the pressure plate and backing plate towards each other, comprises a yoke 29, each arm of which is pivotally attached by pins 30 to member B, and which has its ends fulcrumed in connecting bolts 31 which are adjustably held in backing plate A by nuts 32. At its top, yoke 29 is connected by pin 33ᵃ and connector 33 with a cable 34 extending through opening 18 in plate A.

Operation

When the vehicle is in operation and the wheels are turning, the disk C, being attached by springs 24 and ring 25 to the now rotating drum 11, is in rotation, and the plate B, being attached to plate A by springs 19, is not in rotation.

As cable 34 is pulled to cause yoke 29 to move inwardly, the plate B is pressed inwardly against springs 19 and toward plate A. Upon only slight inward movement, the friction surface 22 of plate B bears against lining ring 23ᵃ of disk C. When contact is first made, the friction between disk and plate B is very slight, but as the plate B is moved inwardly the tension in springs 24 increases and the lining ring 23ᵃ is pressed more firmly against friction surface 22. When the cable 34 is pulled still farther, and plate B is caused to move against the tension in both springs 19 and springs 24, the lining ring 23 of disk C comes into frictional contact with surface 17 of the plate A, and both of surfaces 17 and 22 are engaging disk C and tending to stop its rotation. Then as the pressure against plate B is increased, even greater friction is produced, and the vehicle is easily and smoothly stopped.

Referring particularly to Fig. 4 of the drawings, it will be noted that the springs 24 are attached to the shoe at their ends most advanced in the direction of wheel rotation, and also that springs 19 are attached to ring 25 at their ends most advanced in the direction of wheel rotation, assuming that the vehicle is moving forwardly. Merely for the purpose of illustration, a left rear wheel of the vehicle has been shown and, as indicated by arrow 34 of Fig. 4, the direction of drum rotation is counter-clockwise. Attachments of the springs to the plate B and ring 25 will be seen to be at the spring ends most advanced in the direction of arrow 34.

By attaching springs in the way just described, the braking torque, when the vehicle is moving forwardly, will tend to stretch the springs rather than to compress or double them. However, the springs must be made sufficiently strong to resist buckling upon braking action when the vehicle is moving in a rearward direction.

In Fig. 7, a modified form of spring 24ᵃ is shown. This spring is attached at its center to ring 25 by bolt 35, and has its two ends attached to disk C' by rivets 36 extending through slots 37 in the disk.

In the operation of the modified form of spring, as plate B moves inwardly to press disk C' inwardly against plate A, the rivets 36 or other fastening means move inwardly along slots 37, and the spring is brought under tension. This form of spring may be effectively used in certain situations where it is particularly desirable to have identical braking connection in forward and rearward directions, or where a very sturdy spring is needed.

The foregoing detailed description has been given for clearness of understanding only, and no unnecessary limitations should be understood therefrom, but the appended claims should be construed as broadly as permissible, in view of the prior art.

I claim:

1. A brake of the character set forth comprising a backing plate, a pressure plate spaced from said backing plate, a disk between said plates, said disk being equipped with resilient means for connecting said disk with the wheel of a vehicle, said means comprising a plurality of leaf springs being adapted to hold said disk normally free from contact with said plates, and means for decreasing the spacing between said plates to bring said disk into contact with said plates, said leaf springs having a sliding connection with said wheel.

2. A brake of the character set forth comprising a backing plate, a pressure plate spaced from said backing plate and equiped with leaf springs arranged to resist a decrease of said spacing, a disk between said plates and equipped with leaf springs secured to a wheel, said last-mentioned leaf springs being arranged to maintain said disk normally in spaced relation with said backing plate and disk, and means for decreasing the spacing between said plates to bring said disk into frictional contact with said plates, certain of said leaf springs being relatively heavier than others thereof.

3. A brake of the character set forth comprising a backing plate, a pressure plate spaced from said backing plate and equipped with springs arranged to resist a decrease of said spacing, a disk between said plates, springs attached at their one ends to said disk and at their other ends to the drum of a vehicle wheel, said other ends being farther advanced in the direction of forward rotation of said wheel, and means for decreasing the spacing between said plates to bring said disk into frictional contact with said plates.

4. A brake of the character set forth comprising a backing plate, a pressure plate spaced from said backing plate and equipped with means for resisting the decrease of said spacing, a disk between said plates, a ring secured to the drum of a vehicle wheel, springs attached at their centers to said ring and having their ends slidably attached to said disk, said springs being adapted to hold said disk normally in spaced relation to said plates, and means for decreasing the spacing between said plates to bring said disk into frictional contact with said plates.

5. A vehicle brake of the character set forth comprising a backing plate, a pressure plate spaced from said backing plate and equipped with springs arranged to resist a decrease of said spacing, a friction disk between said plates, elongate resilient metal strips connecting said disk and a part carried by the vehicle wheel and adapted upon flexing to permit limited axial and circumferential movement of said disk and said wheel relative to each other, and adjustable means for decreasing the spacing between said plates to bring said plates into yielding contact with said friction disk.

6. A vehicle brake comprising a fixed backing plate, a movable pressure plate spaced from said backing plate and equipped with springs arranged to resist a decrease of spacing between said pressure plate and said backing plate, a disk disposed in spaced relation between said plates and resiliently connected with the vehicle wheel through a plurality of spring members, each spring member having one end secured to said disk and the other end connected with a part secured to the vehicle wheel, said last-named ends being farther advanced in the direction of forward rotation of said wheel than the ends secured to said disk, and means for moving said pressure plate to decrease the spacing between said pressure plate and said backing plate and to bring said disk into frictional contact with said pressure plate and said backing plate.

7. A disk brake comprising a backing plate, a pressure plate resiliently connected with and spaced apart from said backing plate by a plurality of heat conducting spring members each having one end secured to said backing plate and each having an opposite end secured to said pressure plate whereby the braking torque and heat generated in said pressure plate are transmitted through said spring members to said backing plate, a friction disk resiliently connected with a part secured to the vehicle wheel through a plurality of elongate spring strap members each secured at one of its ends to said disk and at its opposite end to said part secured to said wheel and effective to hold said disk in a predetermined position between said backing plate and said pressure plate while permitting limited circumferential and axial movement of said disk relative to said part connected with the wheel, and means for moving said pressure plate toward said backing plate and into braking engagement with said friction disk.

8. A vehicle brake comprising a backing plate, a pressure plate resiliently connected with and spaced apart from said backing plate by a plurality of heat conducting spring strap members, each having one end secured to said backing plate and each having an opposite end secured to said pressure plate whereby the braking torque and heat generated in said pressure plate are transmitted through said resilient strap members to said backing plate, a friction disk resiliently connected with a part secured to the vehicle wheel through a plurality of elongate spring strap members each secured at one of its ends to said disk and at its opposite end to said part secured to said wheel and effective to hold said disk in a predetermined position in spaced relation between said backing plate and said pressure plate while permitting limited circumferential and axial movement of said disk relative to said part connected with the wheel, and means for moving said pressure plate toward said backing plate and into braking engagement with said friction disk and for moving said friction disk into braking engagement with said backing plate.

9. A disk brake comprising a backing plate, a pressure plate resiliently connected with and spaced apart from said backing plate, said pressure plate comprising an annular member resiliently connected at a plurality of points adjacent its inner circumference with said backing plate by a plurality of resilient strap connectors, each having one end secured to the inner circumference of said annular pressure plate and the other end secured to said backing plate whereby braking torque is resiliently transmitted from said pressure plate to said backing plate and heat generated in said pressure plate during the braking operation is conducted through said connectors to said backing plate and radiated therefrom, and a friction disk resiliently connected with a part secured to the vehicle wheel through a plurality of elongate spring strap members each secured at one of its ends to said disk and at its opposite end to said part secured to said wheel and effective to hold said disk in a predetermined position in spaced relation between said backing plate and said pressure plate while permitting limited circumferential and axial movement of said disk relative to said part connected with the wheel, and means for moving said pressure plate toward said backing plate for braking engagement with said friction disk.

10. In a brake of the character set forth, having a backing plate and a pressure plate, a disk suspended between and in spaced relation to said plates, relatively flat flexible links connecting said disk with a vehicle wheel and maintaining said disk in said suspended position, the points of connection between said links and said wheel being farther advanced in the direction of forward rotation of said wheel than are the points of connection between said links and said plate, and means for moving said pressure plate toward said backing plate to bring said disk into frictional contact with said pressure plate.

11. A disk brake comprising a backing plate, a pressure plate maintained in resiliently spaced relation to said backing plate and mounted for limited movement relative to said backing plate, a plurality of resilient connectors secured to said backing plate and said pressure plate, each comprising an elongate resilient strap having one end secured to said pressure plate and the other end secured to said backing plate, a friction disk resiliently connected with a part secured to a vehicle wheel through a plurality of elongate spring strap members each secured at one of its ends to said disk and at its opposite end to said part secured to said wheel and effective to hold said disk in a predetermined position between said backing plate and said pressure plate while permitting limited circumferential and axial movement of said disk relative to said part connected with the wheel, and means for moving said pressure plate toward said backing plate and into braking engagement with said friction disk, all of said elongate straps being longitudinally flexible under the loads imposed thereon upon application of braking pressures to said disk while it is rotating, whereby a limited circumferential movement of said pressure plate relative to said backing plate and of said disk to said wheel is permitted.

JOSEPH M. MILAN.